(12) United States Patent
Armenia et al.

(10) Patent No.: US 6,446,671 B2
(45) Date of Patent: Sep. 10, 2002

(54) DOUBLE WALL SAFETY HOSE

(76) Inventors: John G. Armenia, P.O. Box 716, Sanibel, FL (US) 33957; Alfred L. Calciano, P.O. Box 716, Sanibel, FL (US) 33957

(*) Notice: Subject to any disclaimer, the term of this patent is extended or adjusted under 35 U.S.C. 154(b) by 0 days.

(21) Appl. No.: 09/772,744

(22) Filed: Jan. 30, 2001

Related U.S. Application Data

(60) Provisional application No. 60/223,198, filed on Aug. 4, 2000.

(51) Int. Cl.$^7$ ................................................ F16L 11/04
(52) U.S. Cl. ..................... 138/109; 138/110; 138/114; 285/13; 285/123.1
(58) Field of Search ................................. 138/109, 114, 138/110, 104; 285/354, 154.3, 245, 418, 13, 123.1

(56) References Cited

U.S. PATENT DOCUMENTS

| | | | | |
|---|---|---|---|---|
| 3,623,513 A | * | 11/1971 | Dinkelkamp | 138/114 |
| 4,274,549 A | * | 6/1981 | Germain | 138/114 |
| 4,650,471 A | * | 3/1987 | Tamari | 138/114 |
| 4,922,971 A | * | 5/1990 | Grantham | 138/109 |
| 4,930,549 A | * | 6/1990 | Renner | 138/104 |
| 5,076,242 A | * | 12/1991 | Parker | 138/114 |
| 5,101,918 A | * | 4/1992 | Smet | 138/114 |
| 5,285,744 A | * | 2/1994 | Grantham et al. | 138/114 |
| 5,931,184 A | * | 8/1999 | Armenia et al. | 138/114 |
| 6,085,796 A | * | 7/2000 | Riga | 138/114 |
| 6,129,107 A | * | 10/2000 | Jackson | 138/114 |
| 6,131,615 A | * | 10/2000 | Hartnagel et al. | 138/114 |
| 6,305,407 B1 | * | 10/2001 | Selby | 138/114 |

* cited by examiner

Primary Examiner—James Hook
(74) Attorney, Agent, or Firm—William E. Noonan

(57) ABSTRACT

A double wall safety hose delivers water from a standard threaded hose bib to an appliance or plumbing fixture. The apparatus includes an outer and an inner hose that extends through the outer hose. The inner hose is communicably attached at each end to respective threaded connector. A closure in the form of a ferrule or bushing surrounds and sealably interengages each end of the inner hose. A corresponding end of the outer hose sealably interengages an enlarged outer surface of the ferrule. This seals each end of the safety hose apparatus so that water leaking through a rupture in the inner hose is retained within the outer hose. A drain port attached to the outer hose discharges water that has leaked from the inner hose to a drain line.

11 Claims, 3 Drawing Sheets

DOUBLE WALL SAFETY HOSE

RELATED APPLICATION

This application claims the benefit of U.S. Provisional Patent Application Serial No. 60/223,198 filed Aug. 4, 2000.

FIELD OF THE INVENTION

This invention relates to a double wall safety hose apparatus for delivering water from a standard hose bib to an appliance or plumbing fixture that utilizes water. More particularly, this invention relates to a safety hose comprising inner and outer hoses that are sealably interconnected at each end so that water leaking from the inner hose wall is confined by the hose.

BACKGROUND OF THE INVENTION

Various types of appliances, including washing machines and dishwashers as well as assorted plumbing fixtures, such as toilets and sinks, must be interconnected through a hose to a source of water. Conventional water hoses, which are normally composed of rubber or plastic, tend to wear and break down over time. Deterioration is caused, for example, by bending of the hose and the repeated passage of water through the hose. Hot water hoses are particularly susceptible to wear because of the stresses caused by repeated changes in temperature. Hose life is also affected by the water quality, water pressure, geographic locale and frequency of use. As the hose deteriorates, ruptures are likely to occur. Eventually, the hose may rupture or burst, which can result in flooding and serious water damage to the room or building in which the appliance or plumbing fixture is located, as well as items located therein. Aggravating and extremely expensive repairs may be necessitated.

Various techniques and procedures have been employed to combat leaks and ruptures in water hoses. Certain of these devices employ sophisticated electronic sensors that detect leakage in the hose and shut off the supply of water to the hose by closing a valve proximate to the hose bib. These products are invariably expensive and virtually impossible for most homeowners to install. They have not significantly reduced the problem of ruptured appliance or plumbing fixture hoses.

Renner, U.S. Pat. No. 4,930,549 discloses a technique for installing a pair of protective sleeves respectively on the hot and cold water hoses of a washing machine. A drainage hose is interconnected between the sleeves for conducting water that leaks from either of the hoses to a standard drain line. This procedure is complicated, time consuming, labor intensive and wholly impractical. The protective sleeve must be cut in various locations and installed in several segments. Up to twenty fittings and clamps must be used and these components cannot be tested until the protective sleeve is fully installed on the hose. Accordingly, the system operates unreliably. If the hose segments or fittings are not properly and precisely fitted, potentially damaging leaks are still very likely to occur. Moreover, the protective sleeves must be wrapped completely about and secured to both the hose bib spout and the inlet of the washing machine. And the outer sleeve can be installed only after the inner hose is already interconnected between the hose bib and the appliance inlet. As a result, the Renner technique is a time consuming and tedious procedure that usually requires the expertise of an expensive professional plumber.

To overcome the foregoing problems, we have developed a number of safety hoses employing inner and outer hose sections for trapping water that leaks from the inner hose section within the outer hose section. See, for example, U.S. Pat. No. 5,931,184.

SUMMARY OF INVENTION

It is therefore an object of the present invention to provide a simplified safety hose apparatus that eliminates the time and effort of installing a separate and distinct seal or closure at each end of the apparatus.

It is a further object of this invention to provide a double wall safety hose that may be installed quickly and effortlessly by the homeowner or other user of the hose and which does not require additional steps to seal the ends of the hose after the hose is connected to the hose bib and the appliance or plumbing fixture.

It is a further object of this invention to provide a safety hose that is relatively simple and inexpensive to manufacture.

It is a further object of this invention to provide a universal safety hose apparatus that comprises a fully factory assembled product, which may be installed quickly and conveniently on a wide variety of appliances and plumbing fixtures, including but not limited to washing machines and dishwashers.

It is a further object of this invention to provide a safety hose apparatus that employs a relatively simple, uncomplicated and inexpensive construction requiring no clamps and only a single continuous length of outer hose.

It is a further object of this invention to provide a safety hose apparatus that operates effectively and reliably to prevent water leaks and the potentially catastrophic and expensive damage caused thereby.

It is a further object of this invention to provide a safety hose apparatus that is conveniently assembled and pressure tested at the factory so that installation is facilitated and consistently reliable and relatively fail-safe operation is achieved.

It is a further object of this invention to provide a safety hose apparatus employing a protective outer hose or sleeve that is never under significant water pressure and which thereby resists rupturing.

It is a further object of this invention to provide a safety hose apparatus that employs an outer sleeve or hose which is not attached directly to either the hose bib or the appliance inlet so that installation of the apparatus is facilitated considerably.

It is a further object of this invention to provide a safety hose apparatus that is easily and inexpensively installed, even by homeowners and lay persons having no plumbing expertise.

This invention results from a realization that a preassembled, double wall safety hose may be constructed simply and inexpensively by sealably securing an elongate outer hose at each end to a respective closure through the use of an interengaging lip and shoulder formed on the hose and closure respectively. Each closure may include a ferrule that is crimped and sealed against a corresponding end of an elongate inner hose and thereby forms a simple and effective seal. Water leaking from the inner hose wall is effectively retained by the outer hose.

This invention features a double wall safety hose apparatus for delivering water from a threaded spout of a hose bib to a threaded appliance inlet or plumbing fixture. The apparatus includes an inner hose having threaded connectors attached rotatably at each end thereof for securing the inner hose to a threaded water spout and a threaded appliance inlet or plumbing fixture, respectively. A generally cylindrical closure component or ferrule is disposed about a first end of the hose in snug or a crimped, sealing interengagement therewith. A second generally cylindrical ferrule is likewise interengaged with the opposite end of the inner hose. Each end of the inner hose is rotatably interconnected to a respective threaded connector by a tubular element or stem that communicably interengages the hose. The tubular element extends through an opening in the threaded connector and has a radial flange that interengages the threaded connector and permits the connector to rotate on the tubular element. A first portion of the cylindrical ferrule is crimped or otherwise urged radially inwardly to sandwich and sealingly interengage the corresponding end of the inner hose between the ferrule and the tubular element. A second portion or shoulder of each ferrule is gripped and sealingly interengaged by a corresponding end of the outer hose such that corresponding ends of the inner and outer hoses are closed. As a result, each end of the safety hose is or sealed so that if a leak occurs in the wall of the inner hose, the leaking water is contained within the space between the inner and outer hoses. A drain port is typically connected to the outer hose to discharge this water into a conventional drain line. A very significant feature of this invention is that the threaded connectors are peripherally exposed by the inner and outer hoses at all times. This permits unhindered rotation of the threaded connectors relative to the outer hose so that the connectors may be threadably engaged with and disengaged from the spout and appliance inlet as needed.

In a preferred embodiment, the second ferrule portion may feature a larger diameter than the first ferrule portion. The second ferrule portion may have a smooth uncrimped outer surface.

DETAILED DESCRIPTION OF PREFERRED EMBODIMENTS

Other objects, features and advantages will occur from the following description of preferred embodiments and the accompanying drawings, in which.

Figure 1:
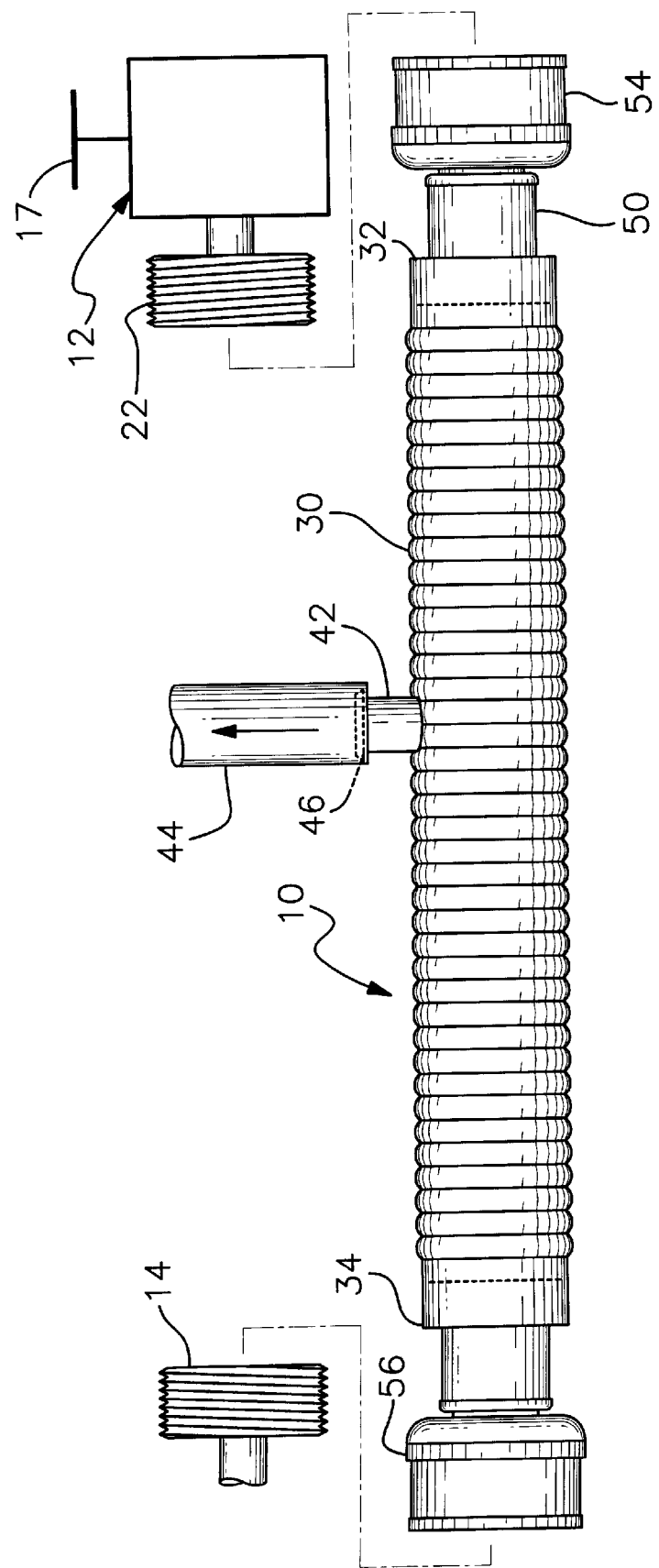
FIG. 1 is an elevational side view of a double wall safety hose according to this invention. The safety hose is depicted between a standard threaded spout of a hose bib and a standard threaded appliance or plumbing fixture inlet.

There is shown in FIG. 1. a double wall safety hose apparatus 10 for delivering water from a standard hose bib 12 to an appliance inlet 14. For example, hose bib 12 may represent the hot water or cold water source for a washing machine. It is particularly preferred that apparatus 10 be employed for the hot water line because that line is subject to greater stresses due to the relatively high temperature of water usually delivered through the hose. It should be understood that apparatus 10 may also be employed with a wide variety of other appliances that are connected to a source of water through a threaded spout. As used herein "appliance" includes all types of machines and also includes plumbing fixtures such as toilets and sinks.

Hose bib 12 includes a threaded spout 22. Washing machine inlet 14 is likewise externally threaded. The hose bib is typically opened and closed by a conventional valve handle 17 that is operated in a known manner. In washing machine applications, a standard washing machine drain hose, not shown, discharges water from the machine into a conventional drain pipe.

Apparatus 10 features an outer wall comprising an elongate hose or sleeve 30. It should be understood that, as used herein, the term "hose" is intended to comprise all forms of conduits. Typically these will be flexible, although rigid conduits are also contemplated as being covered by this invention. Hose 30 is preferably composed of rubber, a synthetic substance such as neoprene and/or a fiber reinforced material. The outer hose is generally uniform in diameter for much of the length of the hose. Annular lips 32, 34 having slightly reduced inner diameters are formed at respective ends of the outer hose. Each such lip may be defined by a relatively thick ring of hose material formed proximate a corresponding end of the hose. The significance of lips 32, 34 is explained more fully below. In alternative embodiments, the outer hose may carry a lip that is not formed unitarily with the hose but rather is attached thereto. Such lips may comprise rings, plugs, cylindrical seals or other components that are manufactured separately and distinctly from the hose but are attached to the hose by various means.

Figure 2:
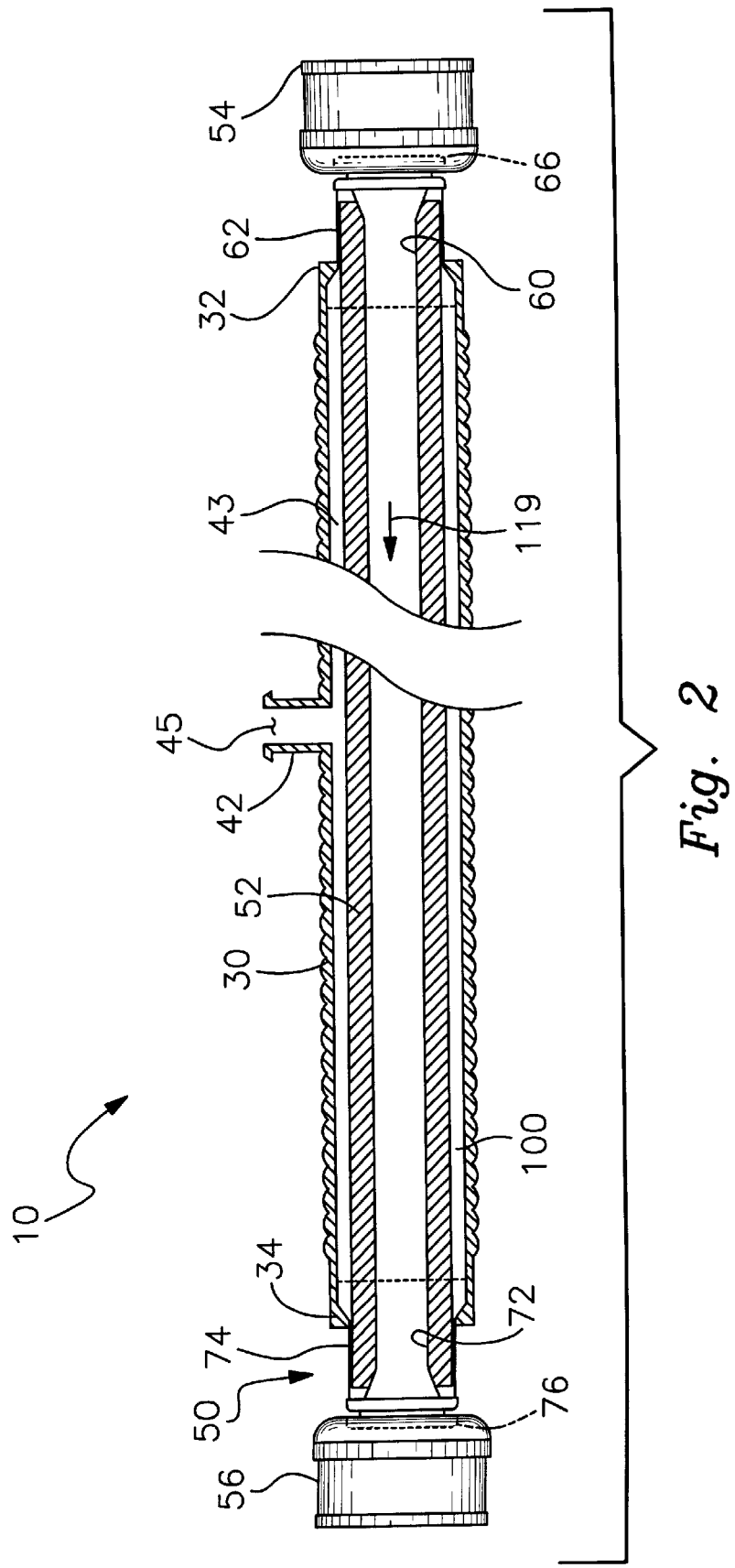
FIG. 2 is an elevational, cross sectional side view of the safety hose.

Outer hose 30 also carries a transverse drain port 42. As illustrated in the drawings, port 42 comprises an annular or cylindrical section of pipe, hose or tubing that is fastened permanently to and extends transversely from hose 30. Drain port 42 may be composed of a wide variety of substances such as PVC or the material comprising the outer hose. The drain port may be fastened in any known manner and at any convenient point along the length of hose 30. As best shown in FIG. 2, outer hose 30 and drain port 42 include respective channels 43 and 45 that communicate with one another. As shown in FIG. 1, a drain conduit 44 is communicably connected to drain port 42 by pushing the drain conduit onto a distal lip 46 of port 42. Conduit 44 extends, for example, to the washing machine drain pipe (not shown). The function of the drain port and the drain conduit are described in conjunction with the operation of the invention as outlined below.

There is also shown in FIGS. 1 and 2 a generally standard inner hose assembly 50 comprising an elongate flexible inner hose 52 (visible only in FIG. 2). This is a standard rubber or synthetic hose of the type commonly employed as a typical washing machine hose. A threaded connector is secured conventionally at each end of hose 52. In particular, a first threaded connector 54 is rotatably and communicably connected to a first end of hose 52 proximate spout 22. A similar second threaded connector 56 is likewise rotatably and communicably connected to the opposite end of hose 52 proximate appliance inlet 14. The threaded connectors are rotatably joined to respective ends of the inner hose by respective fittings. Each fitting comprises an inner tubular element and a closure that surrounds the tubular element. Not only does the fitting operably interconnect the threaded connector with a respective end of the inner hose, the fitting also attaches to a respective end of outer hose 30, in a manner that is described more fully below. The fittings may be constructed as follows.

As best shown in FIG. 2, the first end of hose 52 is communicably joined with a first inner tubular element or pipe 60. Pipe 60 extends through the central opening in the bottom of connector 54 and terminates in a radially outwardly extending flange 66. This flange interengages connector 54 such that the threaded connector is secured rotatably to pipe 60 and thereby to hose 52. One or more standard washers (not shown) may also be disposed within the connector. The threaded connector may be rotatably secured to the inner hose by various other types of structure within the scope of this invention.

Figure 3:
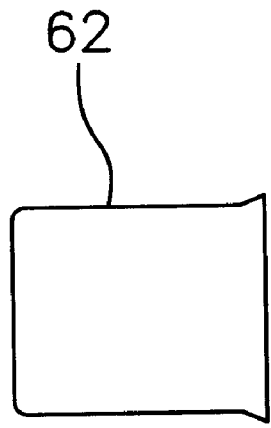
FIG. 3 is a side elevational view of a preferred bushing or ferrule in an uncrimped condition.
Figure 4:
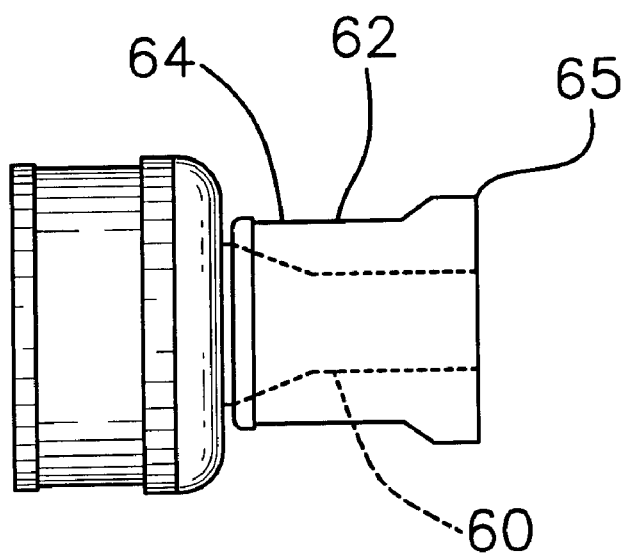
FIG. 4 is a side elevational view of the ferrule as engaged with the tubular stem and threaded connector and with the ferrule in a radially crimped condition.

An outer closure in the form of a ferrule 62 is disposed exteriorly about the first end of hose 52. Pipe 60 and ferrule 62 are crimped together in a known manner such that they are sandwiched securely about the first end of the inner hose 52. Ferrule 62 is shown alone in FIG. 3, prior to being crimped. Initially, before apparatus 10 is manufactured, ferrule 62 comprises a cylinder or bushing having a generally uniform outer diameter. This component is placed over the end of inner hose 52. The ferrule is then crimped or pinched along the majority of its length such that the end of the inner hose is secured between tube 60 and ferrule 62. In FIG. 4, this crimped or reduced diameter portion of ferrule 62 is designated as first portion 64. The opposite end of the ferrule is not crimped or pinched and therefore comprises a diametrically enlarged second portion or shoulder 65.

A similar structure is provided at the opposite second end of the inner hose apparatus. That end of hose 52 is pinched, crimped or sandwiched between a second inner pipe or tube 72 and a second outer ferrule 74. The second ferrule is formed and configured in the manner previously described for ferrule 62. Pipe 72 extends through the central opening in the bottom of connector 56 and flares radially outwardly, terminating in flange 76. The flange interengages the inside bottom surface of connector 56 to rotatably secure that threaded connector to the second end of hose 52. Once again, washers (not shown) may be disposed within connector.

Inner hose 52 extends centrally through outer hose 30 such that an annular space 100 is formed between the inner and outer hoses. The reduced diameter lips 32 and 34 at the respective ends of outer hose 30 overlap and snugly interengage respective enlarged shoulders 65 of ferrules 62 and 74. As a result, the outer hose grips and is secured between the ferrules formed at the respective ends of the safety hose. Each end of inner hose 52 is sealably engaged by the inside cylindrical surface of a respective crimped first ferrule portion 64. At the same time, each end of the outer hose grips and sealably interengages the outside surface of a respective ferrule shoulder 65. The sealing interengagement between each ferrule and corresponding ends of the inner and outer hoses effectively defines a seal or closure at each end of the safety hose apparatus. Water that leaks through a ruptured inner hose 52 is thereby retained within annular space 100.

It should be noted that, in alternative embodiments, the closure (i.e. the ferrule) may be somewhat different from that depicted in the drawings. For example, the closure may comprise a generally cylindrical or plug-like component that engages and surrounds the inner tubular member. It is not necessary that the ferrule or other closure have distinct crimped and uncrimped portions. Rather, a shoulder may be formed by a portion of the closure extending radially from the tubular element. The cylindrical portion of the ferrule may have a uniform rather than a flared diameter. In any event, the ferrule (or other closure) and the outer hose must include or carry a shoulder and a lip, respectively, that interengage to securely and sealably attached the outer hose to the closure.

The inner and outer hoses may be composed of various flexible, water resistant materials including rubber, neoprene and a wide variety of other natural and plastic substances. In certain versions one or more of the hoses may have a corrugated configuration. Preferably, the entire safety hose apparatus is mass produced or otherwise fully assembled and tested at the factory. It should be understood that the ferrules, inner tubes and threaded connectors are merely intended to be preferred representative means for accomplishing the purpose of this invention. In alternative embodiments, various other types of equivalent structure may be used. These components are typically composed of durable and rust resistant plastics and metals. In certain embodiments, the ferrule may also be composed of neoprene, rubber and other substances. Likewise, when the lip is manufactured separately from the hose, a variety of water resistant materials may be utilized.

Safety hose apparatus 10 is installed quickly and conveniently. First the homeowner or other installer turns off the valve 17 in hose bib 12. The old hose interconnecting the bib and the appliance is then removed and discarded. Next, fully assembled apparatus 10 is installed. To install apparatus 10, threaded connector 54 is screwed onto threaded spout 22. The opposite threaded connector 56 is similarly screwed onto threaded appliance inlet 14. Finally, drain hose 44 is attached to drain port 42. The opposite end of the drain hose is inserted into the standard appliance drain pipe. Apparatus 10 is now fully installed and ready to use.

To operate the appliance, valve 12 is open. Each time the washing machine or other appliance is used, water is delivered through the apparatus from the hose bib to the appliance inlet 14. Specifically, water is introduced through connector 54 into pipe 60. Water travels in the direction of arrow 119, FIG. 2, through inner hose 52. This water eventually reaches the second pipe 72 and exists connector 56 into appliance inlet 14. During normal operation, the appliances uses the water and eventually discharges the water through the standard appliance drain line.

In the event that a crack, break, leak or other rupture occurs in inner hose 52, water enters annular space 100 between inner hose 52 and outer hose 30. The closures formed at respective ends of the apparatus by the ferrules and sealably interengaged inner and outer hoses serve effectively to plug or close the ends of apparatus 10 and retain water within space 100. This water is discharged through outlet 42 into drain hose 44. The drain hose conducts the water into the appliance drain pipe. As a result, the leaking water is captured by the outer hose 30 and released into the standard drain pipe. Potentially expensive damage to the room, building and/or furniture is thereby avoided.

In alternative embodiments, the outlet port and drain hose may be omitted. In such versions, the device preferably employs some type of indicator which warns the homeowner that the inner hose has burst or otherwise ruptured. A visual or audio indicator may be employed. In such embodiments, when the inner hose bursts or ruptures, the outer hose prevents water leaking into the room. Water continues to be delivered to and used by the appliance. The use of some type of warning indicator is desirable in such cases because eventually, the outer hose may deteriorate and leak. It should be noted that a warning indicatory may also be employed when a drain conduit is used as in the above manner.

It should be noted that in alternative embodiments, the fittings may be formed by various other types of structure within the scope of this invention. For example, the closures may be formed by alternative types of single and multiple-part components. The closure may be attached to the tubular element by various means such as welding, adhesives, etc. In some embodiments, the tubular element and ferrule may be constructed of a single unitary piece of material. In all versions, the threaded connector at each end of the hose assembly should be exposed sufficiently by the outer hose such that the connector is freely rotatable by hand and thereby easily engaged with and disengaged from either the hose bib spout or the appliance inlet. Additionally, a closure should be formed at each end of the outer hose so that water leaking from a hose or rupture in the inner hose is retained within the space between the hoses. A drain port may then be provided for removing water from the space. The drain outlet may be located at various positions along the length of the safety hose apparatus.

Accordingly, the present invention features a very reliable, easy to install and inexpensively manufactured double wall safety hose that is suitable for use in washing machines, dishwashers and all types of appliances and plumbing fixtures utilizing water. End fittings and the manufacturing effort and expense associated therewith are eliminated. The hose may be fully assembled and pressure tested at the factory. Installation is quick, simple and inexpensive. Clamps and multiple sleeve segments are eliminated. Reliable protection is provided against potentially catastrophic hose ruptures. Because each end of the outer hose is fastened to a respective ferrule at a point that fully exposes the rotatable threaded connector, the entire product may be installed by virtually anyone in only a few moments. The prior art, which requires that the outer sleeve be attached directly to and cover the threaded connectors, does not permit such an installation. Accordingly, the known art teaches a fairly intricate and costly installation procedure for covering an existing hose. In contrast, the present invention discloses a fully assembled, factory tested product that is installed quickly, simply and inexpensively onto the appliance.

From the foregoing it may be seen that the apparatus of this invention provides for a double wall safety hose apparatus for delivering water from a standard hose bib to an appliance or plumbing fixture that utilizes water. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims.

What is claimed is:

1. A safety hose apparatus for delivering water from a threaded spout of a standard hose bib to a standard threaded appliance inlet, said apparatus comprising:

a continuous outer hose;

an inner hose extending through said outer hose; and a pair of end fittings respectively attached to corresponding ends of said inner and outer hoses, each end fitting including an interior tubular element to which a corresponding end of said inner hose is attached, a threaded connector rotatably attached to said tubular element and threadably engagable with a respective one of the threaded spout and threaded appliance inlet, and a closure attached to and generally annularly surrounding said tubular element, said closure including a generally radial shoulder; the corresponding end of said outer hose carrying a radially inwardly turned lip having a diameter that is less than an interior diameter of said outer hose, said lip radially overlapping and interengaging said shoulder to secure said outer hose to said closure, whereby water leaking through a rupture in said inner hose is contained between said inner and outer hoses.

2. The apparatus of claim 1 in which said closure includes a ferrule having a reduced diameter portion connected to said shoulder.

3. The apparatus of claim 2 in which a corresponding end of said inner hose is sandwiched between and sealingly interengaged by said reduced diameter portion of said ferrule and said tubular element.

4. The apparatus of claim 3 in which said reduced diameter portion of said ferrule is circumferentially crimped to sandwich said inner hose between said ferrule and said tubular element.

5. The apparatus of claim 1 in which said lip is unitarily connected to said outer hose.

6. The apparatus of claim 1 in which said lip sealingly interengages said shoulder of said closure.

7. The apparatus of claim 1 in which a drain port is connected to said outer hose to discharge the water contained between said inner and outer hoses therethrough.

8. The apparatus of claim 1 in which said threaded connector is peripherally exposed by said inner and outer hoses to permit unhindered rotation of said threaded connector relative to said outer hose, whereby said connector may be threadably engaged with and disengaged from a respective one of the spout and appliance inlet.

9. A safety hose apparatus for delivering water from a threaded spout of a standard hose bib to a standard threaded appliance inlet, said apparatus comprising:

a continuous outer hose;

an inner hose extending through said outer hose; and a pair of end fittings respectively attached to corresponding ends of said inner and outer hoses, each end fitting including an interior tubular element to which a corresponding end of said inner hose is attached, a threaded connector rotatably attached to said tubular element and threadably engagable with a respective one of the threaded spout and threaded appliance inlet, and a closure attached to and generally angularly surrounding said tubular element, said closure including a generally radial shoulder; the corresponding end of said outer hose carrying a radially inwardly turned lip having a diameter that is less than an interior diameter of said outer hose, said lip radially overlapping and interengaging said shoulder to secure said outer hose to said closure, said overlapping lip and said shoulder being threadlessly interengaged, whereby water leaking through a rupture in said inner hose is contained between said inner and outer hoses.

10. A safety hose apparatus for delivering water from a threaded spout of a standard hose bib to a standard threaded appliance inlet, said apparatus comprising:

a continuous outer hose;

an inner hose extending through said outer hose; and a pair of end fittings respectively attached to corresponding ends of said inner and outer hoses, each end fitting including an interior tubular element to which a corresponding end of said inner hose is attached, a threaded connector rotatably attached to said tubular element and threadably engagable with a respective one of the threaded spout and threaded appliance inlet, and a closure attached to and generally annularly surrounding said tubular element, said closure including a generally radial shoulder; the corresponding end of said outer hose carrying a generally radial, reduced diameter lip that overlaps and interengages said shoulder to secure said outer hose to said closure, said closure further including a ferrule having a reduced diameter portion connected to said shoulder, a corresponding end of said inner hose being sandwiched between and sealingly interengaged by said reduced diameter portion of said ferrule and said tubular element, whereby water leaking through a rupture in said inner hose is contained between said inner and outer hoses.

11. The apparatus of claim 10 in which said reduced diameter portion of said ferrule is circumferentially crimped to sandwich said inner hose between said ferrule and said tubular element.

* * * * *